Figure 1:
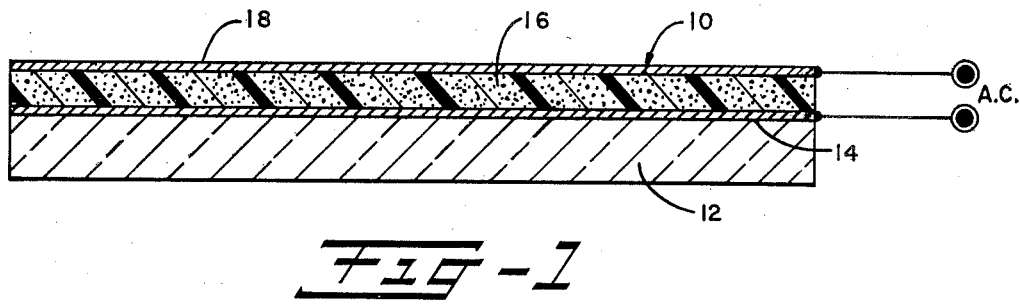

United States Patent Office 3,213,341
Patented Oct. 19, 1965

3,213,341
POLYMERS SUITABLE FOR USE IN ELECTRO-
LUMINESCENT LAMPS AND CAPACITORS
Frank Scotti, Westport, and Ellsworth C. McClenachan, Stamford, Conn., assignors to American Cyanamid Company, New York, N.Y., a corporation of Maine
Filed Nov. 24, 1961, Ser. No. 155,248
9 Claims. (Cl. 317—258)

The present invention is concerned with electroluminescent devices and to other electrical apparatus and has particular reference to matrices composed of a polymeric material having a high dielectric constant which is particularly suitable for use in electrical capacitors and the like.

More particularly, this invention relates to novel, unitary, multi-layer electroluminescent devices comprising two or more electrically conductive surfaces having interposed therebetween a novel phosphor-containing dielectric structure.

Still more particularly, this invention relates to novel electrical capacitors having as the interior assembly thereof a polymeric material possessing a high dielectric constant.

Electroluminescent devices, such as those contemplated by the instant invention, are basically simple structures comprising, in essence, two electrodes, at least one of which transmits light, between which a phosphor is embedded in a suitable matrix.

Capacitors, on the other hand, are somewhat more complex devices generally comprising a metal casing within which are located a plurality of separate metal foil electrodes. Generally, there will be located inside the casing, a pair of electrodes composed of an electrically conductive metal such as aluminum, tin, copper or the like. Said electrodes are usually separated from one another by at least one sheet of another material. The metallic sheets which form the electrodes are then tightly wound with the other material interposed therebetween to prevent electrical contact between the electrodes. The wound element is then inserted into the metal casing and connected to terminal contact members extending through the casing. After all traces of moisture and other volatile substances have been removed by heat treatment, the casing is permanently sealed.

One critical requirement for a suitable matrix in illuminescent devices is that it have a high dielectric constant. The same requirement is necessary for the material which is used as the insulation between the electrodes present inside the casings of capacitors. Among the dielectric matrices for electroluminescent phosphors and the insulators and separators for capacitors which have been suggested are the cyano ethers of cellulose, see for example U.S. Patents 2,774,004, 2,792,447, 2,901,652, 2,918,594 and 2,920,256. These patents generally suggest the use of certain types of cyanoethylated cellulose as a preferred material of high dielectric constant.

It has been found, however, that although cyanoethylated cellulose is excellent in regard to its dielectric constant, it possesses other characteristics which detract from the commercial attractiveness of products produced with it, i.e. electroluminescent devices and capacitors. The primary disadvantage of the use of cyanoethylated cellulose is its high cost. This high cost stems directly from the increased cost of manufacture of the cyanoethylated cellulose. Specifically, the need for extensive washing of the cellulose which has been cyanoethylated adds greatly to its cost and therefore the selling price of products containing cyanoethyl cellulose must be proportionately increased. Additionally, the matrix of an electroluminescent device must solidly adhere to the electrodes of the device and cyanoethylated cellulose, although satisfactory, has not exhibited the best results in this regard. Accordingly, it can be seen that there still exists an acute need for new materials which may be used in electroluminescent devices and capacitors etc. which couple a high dielectric constant with good adhesion.

It has now been discovered that electrical capacitors of high capacitance per unit value and electroluminescent devices having a low production cost and excellent properties regarding fabrication and adhesion can be produced utilizing the polymeric solid plastic material hereinafter described.

It is therefore an object of the present invention to develop a composition suitable for such dielectric purposes as the preparation of phosphor-bearing matrices, capacitor assemblies and the like without being subject to the above noted deficiencies of high cost and poor adhesion.

A further object of the present invention is to provide electrical apparatus insulated by and composed of a material having a relatively high dielectric constant, said material comprising a polymer of a cyanoalkylated acrylate.

Still another object of the present invention is to provide electroluminescent devices composed of matrices having high dielectric constants, good adhesion, water resistance, clarity, low dissipation factors, good dielectric strength, good mechanical strength and facility of production.

Still another object of the present invention is to provide electrical capacitors having associated therewith sheet material having a relatively high dielectric constant, said sheet material comprising sheets of a polymer of a cyanoalkylated acrylate.

Other and further objects of the present invention will become apparent upon reading the more detailed description set forth hereinbelow.

In regard to electroluminescent devices, it should again be stated that matrices used in such devices should possess high dielectric constants, low dissipation factor, good adhesion to substrate, i.e. glass, good water resistance, clarity, good dielectric strength, good mechanical strength and good tear and tensile strength.

To be entirely satisfactory for such purposes, the matrix must have a dielectric constant of at least about 8. It is also clear that the dissipation factor should be as low as possible since a high dissipation factor represents waste of electrical energy into unwanted heat. The dissipation factor should be below about 0.028 and preferably below about 0.025. In addition, such matrices should be substantially waterwhite in order to emit the most possible light therethrough. The matrix should have a dielectric strength of at least about 1800 volts per mil for a 3 mil thickness. Preferably the higher the dielectric constant and dielectric strength and the lower the dissipation factor, the better the electroluminescent device.

The degree of adhesion of the matrix to a conductive coating on a suitable transparent or translucent electrode should be relatively high to be satisfactory. Such an electrode is typically a glass sheet or some other physically equivalent transparent or translucent non-conductor having a conductive coating imbedded in one surface thereof. A typical coating will consist of a tin oxide film (U.S. Patent 2,838,715) or its equivalent. In order to obtain the desired electrical contact, the minimum adhesion of the phosphor-containing matrix to the conductive coating must be sufficient to insure that the matrix film will not peel spontaneously from the conductive surface during the drying of the film which follows the casting of a suitable solution onto the conductive surface of the electrode.

While the weakness of the matrix, i.e. the tensile strength, is not as serious a drawback as its poor adhesion, any improvement in this direction is desirable particularly for example, in flexible luminescent panels.

We have found that matrices and capacitor assemblies possessing all the above-mentioned requirements can be produced utilizing, as the material therefore, various polymers of cyanoalkylated acrylates. These polymers of the cyanoalkylated acrylates are known in the art and may be prepared from monomers having the following formula

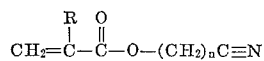

(I)

wherein $n$ is a whole positive integer of from about 1 to 8 and R is a substituent selected from the group consisting of hydrogen and an alkyl radical having from about 1 to 8 carbon atoms.

Examples of the compounds which may be used to form polymers for use in the present invention and which are represented by Formula I above, include such compounds as cyanomethyl acrylate, cyanomethyl methacrylate, cyanomethyl α-ethylacrylate, cyanomethyl α-propylacrylate, cyanomethyl α-butylacrylate, cyanomethyl α-amylacrylate, cyanomethyl α-octylacrylate, cyanomethyl α-heptylacrylate, cyanomethyl α-hexylacrylate, 2-cyanoethyl acrylate, 2-cyanoethyl methacrylate, 2-cyanoethyl α-ethylacrylate, 2-cyanoethyl α-propylacrylate, 2-cyanoethyl α-butylacrylate, 2-cyanoethyl α-amylacrylate, 2-cyanoethyl α-octylacrylate, 2-cyanoethyl α-heptylacrylate, 2-cyanoethyl α-hexylacrylate, 3-cyanopropyl acrylate, 3-cyanopropyl methacrylate, 3-cyanopropyl α-ethylacrylate, 3-cyanopropyl α-propylacrylate, 3-cyanopropyl α-butylacrylate, 3-cyanopropyl α-amylacrylate, 3-cyanopropyl α-octylacrylate, 3-cyanopropyl α-heptylacrylate, 3-cyanopropyl α-hexylacrylate, 4-cyanobutyl acrylate, 4-cyanobutyl methacrylate, 4-cyanobutyl α-ethylacrylate, 4-cyanobutyl α-propylacrylate, 4-cyanobutyl α-butylacrylate, 4-cyanobutyl α-amylacrylate, 4-cyanobutyl α-octylacrylate, 4-cyanobutyl α-heptyl acrylate, 4-cyanobutyl α-hexylacrylate, 5-cyanoamyl acrylate, 5-cyanoamyl methacrylate, 5-cyanoamyl α-ethylacrylate, 5-cyanoamyl α-propylacrylate, 5-cyanoamyl α-butylacrylate, 5-cyanoamyl α-amylacrylate, 5-cyanoamyl α-octyl acrylate, 5-cyanoamyl α-heptylacrylate, 5-cyanoamyl α-hexylacrylate, 6-cyanohexyl acrylate, 6-cyanohexyl methacrylate, 6-cyanohexyl α-ethylacrylate, 6-cyanohexyl α-propylacrylate, 6-cyanohexyl α-butylacrylate, 6-cyanohexyl α-amylacrylate, 6-cyanohexyl α-octylacrylate, 6-cyanohexyl α-heptylacrylate, 6-cyanohexyl α-hexylacrylate, 7-cyanoheptyl acrylate, 7-cyanoheptyl methacrylate, 7-cyanoheptyl α-ethylacrylate, 7-cyanoheptyl α-propylacrylate, 7-cyanoheptyl α-butylacrylate, 7-cyanoheptyl α-amylacrylate, 7-cyanoheptyl α-octylacrylate, 7-cyanoheptyl α-heptylacrylate, 7-cyanoheptyl α-hexylacrylate, 8-cyanooctyl acrylate, 8-cyanooctyl methacrylate, 8-cyanooctyl α-ethylacrylate, 8-cyanooctyl α-propylacrylate, 8-cyanooctyl α-butylacrylate, 8-cyanooctyl α-amylacrylate, 8-cyanooctyl α-octyl acrylate, 8-cyanooctyl α-heptylacrylate, 8-cyanooctyl α-hexyl acrylate and the like.

As mentioned above, these acrylates are known in the art and may be produced by any known method, that disclosed in U.S. Patent 2,379,297 being exemplary. The polymers of these acrylates may also be produced in the manner shown by said patent or as shown in the examples below. The preparation of the monomers or the polymers of the monomers represented by Formula I, above, constitutes no part of this invention.

The polymers of the cyanoalkyled acrylates which are used as the matrices or capacitor assemblies in the present invention may be used in the form of homopolymers or copolymers with various monomers containing a polymerizable $CH_2=C<$ group. When copolymers are utilized they should contain at least about 50% of the cyanoalkylated acrylate monomer and not more than 50% of the monomer copolymerizable therewith, preferably 75% to 95% and 25% to 5%, respectively.

Examples of monomers which can be copolymerized with the monomers represented by Formula I, and which can be polymerized either singly or in a plurality (two, three, four or any desired number), the latter often being desirable in order to improve the compatability and copolymerization characteristics of the mixture of monomers and to obtain copolymers having the particular properties desired for the particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated aliphatic and aromatic monobasic and polybasic acids such, for instance, as acetic, propionic, butyric, valeric, caproic, crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetrachlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyl dibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, ethyl methallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; ethylene; unsaturated polyhydric alcohol (e.g., butenediol, etc.) esters of saturated and unsaturated, aliphatic and aromatic, monobasic and polybasic acids.

Other examples of monomers that can be copolymerized with the monomers of Formula I are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide, other comonomers being added if needed in order to improve the compatibility and copolymerization characteristics of the mixed monomers.

More specific examples of allyl compounds that can be copolymerized with the compounds of Formula I are allyl alcohol, methallyl alcohol, diallyl carbonate, allyl lactate, allyl alphahydroxyisobutyrate, allyl trichlorosilane, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disiloxane, etc. Other examples of allyl compounds that may be employed are given, for example in U.S. Patent No. 2,510,503, issued June 6, 1950.

Among the comonomers which are preferred for use in carrying our invention into effect are, for example, compounds such as acrylonitrile, and other compounds, e.g., the various substituted acrylonitriles (e.g., methacrylonitrile, ethacrylonitrile, phenylacrylonitrile, etc.), the various N-substituted acrylamides and alkacrylamides, for instance, N-dialkyl acrylamides and methacrylamides, e.g., N-dimethyl, -diethyl, -dipropyl, -dibutyl, etc., acrylamides and methacrylamides. Other monomers copolymerizable with the instant novel monomers are given, for instance, in United States Patent No. 2,601,572, dated June 24, 1952, where examples are given both by classes and species.

Of course, it is also possible to utilize copolymers produced from two or more of the monomers represented by Formula I, above, and still obtain the benefits heretofore set forth.

The polymers in solution are generally treated to incorporate the phosphor therein and are then spread on the conductive glass. The preferred amount of phosphor incorporated into the polymer will generally be equal to the percentage of solids in the polymer solution being cast. However, lower or higher amounts of phosphor may be incorporated depending upon the particle size of the phosphor. Generally, the size of the particles of phosphor ranges from .5µ to 50µ, with sizes less than 25µ being preferred. It is possible to incorporate 25% to 200% of the phosphor, based on the weight of the polymer into the polymer, with amounts of 100% to 150% being preferred.

When spraying the polymer sheet onto the conductive glass, a 1% to 20% solution of polymer may be used with a 3% to 8% solution being preferred. Other methods, e.g. casting, of spreading the polymer onto the conductive glass may enable the use of polymer solutions containing as high as 40% solids.

Atop this phosphor-containing polymer matrix is placed the second electrode. This may be a sheet of metal, usually aluminum. Sometimes however, this electrode is formed by metallizing the upper surface of the phosphor-containing polymer layer. This metallizing may be accomplished by any of several procedures well known in the art and the particular method utilized forms no part of the present invention.

Application of a suitable alternating current to the two electrodes results in energizing the phosphor disseminated throughout the polymer matrix and light is transmitted through and emitted by the transparent surface.

The film layer of polymer comprising the matrix may, as mentioned above, be formed from suitable solution. Solutions of adequate high concentration and sufficiently low viscosity are necessary. Solvents may be used in such concentration as is necessary to dissolve the polymer and enable casting thereof.

Any suitable phosphor may be used. In the instant discussion, activated zinc sulfide will be used as an illustration. It should be understood however, that any of the commercially available phosphors, many of which are set forth in the above cited patents, may be used.

Spreading of the phosphor-containing solution of polymer on the surface to be treated may be done in any contional manner. Procedures such as flowing, casting, spraying or doctoring are well understood in the art. The exact procedure used is not critical and forms no part of the present invention. As long as the method is capable of producing a good, uniform layer it may satisfactorily be used. After spreading, the film is then dried.

So far as is practical, each film or layer, if more than one is used, should be fully dried before application of the next layer. This drying may be done by holding the film at 40° C. or by holding the film in an infrared drying oven for about 15 minutes followed by conventional oven drying for one hour at 100 to 130° C. Generally, any method may be utilized for drying the film, with methods which enable recovery of the evolved solvent, considered most practical.

The thickness of the layer of the phosphor-containing matrix is not critical and is usually governed by the desired end use of the electroluminescent device. Generally the thickness of the film, if the phosphor is not contained in the matrix, must be enough to completely cover the phosphor. However, the thickness is dependent usually upon the desired brightness of the lamp. The lamp can be made brighter by utilizing a higher voltage but this is somewhat complicated and brightness is usually controlled by a thickness of the matrix; the thinner the matrix, the brighter the lamp.

As mentioned above, the top electrode is usually made of a metal, i.e. aluminum, and it is possible to bond the metal foil to the matrix by one of three different methods. None of the following methods are critical in the instant application and any of these may be utilized. The first method is to merely spray the aluminum onto the matrix and let it dry. The second method is well known in the art and is usually referred to as vacuum deposition and constitutes bonding the electrode by vacuum evaporation of a metal on a substrate. The third method is by mechanical lamination and this constitutes embedding an electrode on a substrate with heat, pressure or a combination thereof.

In regard to the electrical capacitors, the same high dielectric materials or mixtures thereof, as mentioned above, in regard to the electroluminescent devices may be used. Heretofore various materials have been utilized as the insulator in capacitors. However, for such reasons as impracticability, high cost, high dissipation factors and the like, the capactiors produced from these materials have not been completely satisfactory. We have found that by the use of polymers of various cyanolkylated acrylates we can produce capacitors which obviate most of the deficiencies which arise concerning those capacitors now commercially available.

The polymers of the cyanoalkylated acrylates which may be used in the capacitors of the present invention may be used in any of several different physical forms. They may be dissolved in suitable solvents and then cast in the form of films or may be precipitated in the form of fibers and made into paper-like sheets and still give the beneficial properties mentioned above. Additionally, the polymers of the cyanoalkylated acrylates may be impregnated into or coated upon other materials such as kraft paper, glass fibers and the like and still be used in the form of sheets in the capacitors of the present invention. If this type of technique is used, it is preferred that the sheet material contain at least 25% by weight of the cyanoalkyl acrylate polymer.

These sheets of polymeric material are then tightly wound interposed between metallic sheets which form the electrodes. The wound element is then inserted into the metal casing and connected to terminal contact members extending outside of the casing. All volatile material is removed and the casing is then permanently sealed.

Figure 2:
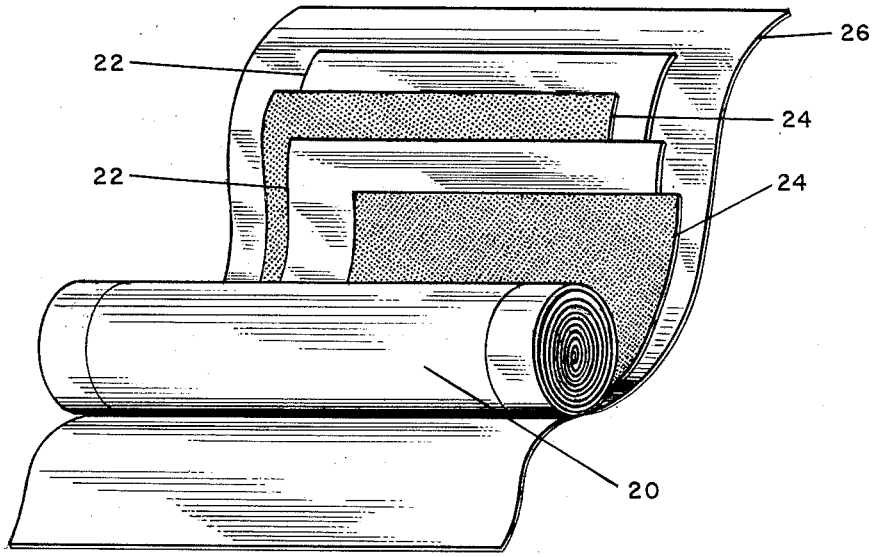

In order that the invention may be more fully understood, reference is made to the accompanying drawing wherein preferred forms of the invention are illustrated and particularly described and wherein:

FIGURE 1 is a sectional, elevational view of a representation of an electroluminescent device and, FIGURE 2 represents a view of a capacitor with a portion thereof unrolled.

Referring now to the drawing, FIGURE 1, represents an electroluminescent lamp 10 which comprises a glass sheet 12 having a conductive coating of electrode 14, generally tin oxide, coated thereon. Coated over the tin oxide layer 14, is a layer 16, comprising a phosphor-laden electroluminescent matrix, i.e. a cyanoalkylated acrylate polymer. Coated over layer 16 is a second electrode 18 which generally consists of a sheet of aluminum. An alternating current applied across the electrodes 14 and 18 results in energizing the phosphor disseminated throughout the matrix and light is transmitted through to and emitted by glass sheet 12.

In FIGURE 2, a capacitor 20 is shown with a portion thereof unrolled. The capacitor comprises alternating layers of metal electrodes 22, usually tin oxide, and sheets of dielectric material 24, i.e. a cyanoalkylated acrylate polymer. The electrodes and dielectric layers are tightly wound and are then encased within metal casing 26, shown unrolled. When the casing is sealed and contact members are connected to the electrode, a capacitor is formed.

Although the above description of the present invention has dealt solely with the use of cyanoalkylated acrylate polymers as the matrix of the electroluminescent devices or the assembly of the capacitors, it is also possible to use the cyanoalkylated acrylate polymers in conjunction with matrices and assemblies composed of known materials, e.g. cyanoethyl cellulose and the like. When a matrix or assembly of this type is utilized, the cyanoalkylated acrylate polymers disclosed above may be employed as an adhesive layer between the matrix or assembly sheets and the electrically conductive layer, i.e. the glass sheet of metal electrode. Alternatively, the cyanoalkylated acrylate polymers may be blended with the cyanoethyl cellulose, for example, and employed as the matrix or assembly, as such. When a matrix or assembly of this latter type is utilized, it is preferred that it contain at least 5% of the cyanoalkylated acrylate polymer.

The following examples are set forth for purposes of illustration only and are not to be construed as limitations on the present invention except as set forth in the appended claims. All parts and percentages are by weight unless otherwise specified.

EXAMPLE 1

*Preparation of 2-cyanoethyl acrylate*

To a suitable reaction vessel equipped with reflux condenser, stirrer, and thermometer are added 85 parts of acrylic acid, 100 parts of 2-cyanoethanol and 2 parts of hydroquinone, as a polymerization inhibitor, in 200 parts of benzene. To this mixture is then added 5 parts of concentrated $H_2SO_4$ and 3 parts of p-toluene sulfonic acid. The mixture is heated at reflux until water no longer distills off with the benzene. The resulting product is washed with sodium hydroxide and water to remove unreacted acrylic acid and 2-cyanoethanol. The product is dried and the benzene is removed under reduced pressure. 60 parts of 2-cyanoethyl acrylate are recovered.

EXAMPLE 2

*Polymerization of 2-cyanoethyl acrylate*

To a suitable reaction vessel equipped with stirrer, nitrogen inlet and outlet and thermometer is added 500 parts of an aqueous solution containing 1 part of the dihexyl ester of sodiosulfosuccinate and 0.1 part of $H_2SO_4$. To this solution is then added 50 parts of inhibitor free 2-cyanoethyl acrylate. The solution is agitated, deaerated and flushed with nitrogen for the duration of the reaction. One part of 2% $NaSO_3$ and 1 part of 2% $(NH_4)_2S_2O_3$ is then added and a 12° C. rise in temperature is observed. The reaction is allowed to continue for one hour and then the emulsion is broken by lowering the temperature of the reaction mixture to below 0° C. The resultant polymer is washed and dried and a yield of 80% of poly-2-cyanoethyl acrylate is realized.

EXAMPLE 3

*Preparation of 2-cyanoethyl acrylate-2-cyanoethyl-methacrylate copolymer*

To a suitable reaction vessel, equipped as in Example 2, is added 500 parts of acetonitrile. To the acetonitrile is the added 80 parts of 2-cyanoethyl acrylate and 20 parts of 2-cyanoethyl methacrylate. The solution is heated to 80° C. deaerated, and purged with nitrogen for the duration of the reaction. 0.4 part of 2,2'-azo-bis-isobutyronitrile is then added and the reaction is allowed to continue for about 1 hour. The copolymer formed is precipitated in water, washed, dried, dissolved in acetone and reprecipitated. The yield is 80%.

EXAMPLE 4

*Fabrication of electroluminescent device*

To a 5% solution by weight of the polymer produced in Example 2 is added 150% by weight of a phosphor. The phosphor is uniformly disseminated through the polymer solution and a 2 mil film of this suspension is sprayed onto a conducting glass plate and dried. A 2 ml film of aluminum powder suspended in a 5% 2-cyanoethyl acrylate-acetonitrile solution is then sprayed over the polymer-phosphor layer and dried. Electrical contacts are then attached to the electrodes and a very satisfactory lamp results.

EXAMPLE 5

*Fabrication of electroluminescent device*

The procedure of Example 4 is followed except that 8% by weight solution of a 3-cyanopropyl acrylate polymer is utilized instead of the polymer produced in Example 2. When sprayed and dried the polymer produces a brilliant lamp.

EXAMPLE 6

*Fabrication of electroluminescent device*

The procedure of Example 4 is again followed except that a 7% by weight solution of 4-cyanobutyl methacrylate polymer is substituted for the polymer of Example 2. After spraying, drying and connecting the electrodes, a fine lamp is produced.

EXAMPLE 7

*Fabrication of electroluminescent device*

To a 40% acetone solution of the copolymer produced in Example 3 is added 40% phosphor. The solution is agitated until the phosphor is uniformly distributed therethrough. A 2 mil film of this solution is then sprayed on a plate of conducting glass and dried. A film of aluminum is then placed on this layer by vacuum deposition and when the electrodes are contacted with an electrical purge, a very bright lamp is produced.

EXAMPLE 8

*Fabrication of electroluminescent device*

The procedure of Example 7 is followed except that a 75/25 2-cyanoethyl acrylate-acrylonitrile copolymer solution is substituted for the copolymer solution of Example 3. A very bright lamp is produced upon spraying, drying, and connecting the electrodes of the device.

EXAMPLE 9

*Fabrication of a capacitor*

A capacitor is prepared by placing a film of a sheet of 2-cyanoethyl acrylate homopolymer between 2 sheets of aluminum. The sheet of 2-cyanoethyl acrylate homopolymer has a thickness of approximately 3 mils. The sheets are then wound together tightly and inserted into a casing. The aluminum foil electrodes are then connected to contact members in the casing. The capacitance of the capacitors is very high as compared to commercially available capacitors.

EXAMPLE 10

*Fabrication of a capacitor*

A very fine capacitor is again produced following the procedure of Example 9 except that a sheet of 5-cyanopentyl acrylate homopolymer is substituted for the homopolymer of β-cyanoethyl acrylate.

EXAMPLE 11

*Preparation of a capacitor*

A capacitor is prepared by very tightly winding a sheet of kraft paper impregnated with 40% of 2-cyanoethyl acrylate homopolymer between two sheets of aluminum foil. After impregnation, the kraft paper has a thickness of 1.5 mils. The wound sheets are placed in a metal container and the electrodes are connected to terminals in the container. The resulting capacitor has an effective dielectric constant greater than a similar commercially available capacitor containing impregnated kraft paper.

We claim:

1. A phosphor-bearing matrix consisting essentially of from about 25% to about 200%, based on the weight of polymer, of an electroluminescent phosphor uniformly disseminated throughout a polymer of a compound having the formula

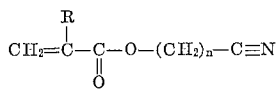

wherein $n$ is a whole positive integer of from 1 to 8, inclusive, and R is a substituent selected from the group consisting of hydrogen and alkyl radical having from about 1 to 8 carbon atoms, inclusive, said polymer having a dielectric constant of at least about 8.0.

2. A phosphor-bearing matrix consisting essentially of from about 25% to about 200%, based on the weight of polymer, of an electroluminescent phosphor uniformly disseminated throughout a polymer of 2-cyanoethyl acrylate, said polymer having a dielectric constant of at least about 8.0.

3. An assembly suitable for use in a capacitor consisting essentially of electrodes separated and insulated from one another by a material consisting essentially of a polymer of a compound having the formula

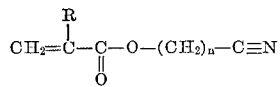

wherein $n$ is a whole positive integer of from about 1 to 8, inclusive, and R is a substituent selected from the group consisting of hydrogen and alkyl radical having from about 1 to 8 carbon atoms, inclusive.

4. An assembly suitable for use in a capacitor consisting essentially of electrodes separated and insulated from one another by a material consisting essentially of a polymer of 2-cyanoethyl acrylate.

5. In an electroluminescent device comprising a light-conductive layer, one surface of which has unitarily embedded therein an electrically conductive layer, a phosphor-bearing matrix and a second electrically conductive layer superimposed on said matrix, the improvement which comprises a phosphor-bearing matrix consisting essentially of from about 25% to about 200%, based on the weight of polymer, of an electroluminescent phosphor uniformly disseminated throughout a polymer of a compound having the formula

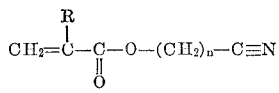

wherein $n$ is a whole positive integer of from 1 to 8, inclusive and R is a substituent selected from the group consisting of hydrogen and alkyl radical having from about 1 to 8 carbon atoms, inclusive, said polymer having a dielectric constant of at least about 8.0.

6. In a device according to claim 5 a phosphor-bearing matrix consisting essentially of an electroluminescent phosphor uniformly disseminated throughout a polymer of 2-cyanoethyl acrylate.

7. In an electrical capacitor comprising, in combination, electrodes and a material separating and insulating the electrodes from one another, the improvement which comprises a separating and insulating material consisting essentially of a polymer of a compound having the formula

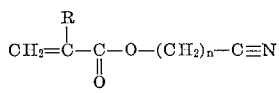

wherein $n$ is a whole positive integer of from 1 to 8, inclusive and R is a substituent selected from the group consisting of hydrogen and alkyl radical having from about 1 to 8 carbon atoms, inclusive.

8. In an electrical capacitor according to claim 7, a separating and insulating material consisting essentially of a polymer of 2-cyanoethyl acrylate.

9. In an electrical capacitor comprising, in combination, a pair of electrodes consisting of an electrically conductive metal and a sheet material separating and insulating the electrodes from one another, the improvement which comprises a separating and insulating sheet material consisting essentially of a polymer of 2-cyanoethyl acrylate.

References Cited by the Examiner

UNITED STATES PATENTS

| | | | |
|---|---|---|---|
| 2,784,127 | 3/57 | Joyner et al. | 260—78.4 |
| 2,951,865 | 9/60 | Jaffe | 313—108 |
| 3,067,141 | 12/62 | Bikales et al. | 252—63.2 |
| 3,096,289 | 7/63 | D'Errico et al. | 252—63.2 |

OTHER REFERENCES

Lewis et al.: "The Rotation of Polar Groups in High Polymers," Journal of Polymer Science, vol. XXI, 1956 pages 411–416.

JOHN F. BURNS, *Primary Examiner.*

JOHN P. WILDMAN, *Examiner.*